US012689251B2

(12) United States Patent
Kim et al.

(10) Patent No.: US 12,689,251 B2
(45) Date of Patent: Jul. 21, 2026

(54) MOTOR COOLING STRUCTURE

(71) Applicant: HYUNDAI MOBIS CO., LTD., Seoul (KR)

(72) Inventors: Dae Wook Kim, Yongin-si (KR); Hyun Ho Park, Suwon-si (KR); Jin Ho Jung, Yongin-si (KR); Hyoung Geun Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 196 days.

(21) Appl. No.: 18/443,546

(22) Filed: Feb. 16, 2024

(65) Prior Publication Data

US 2024/0333050 A1 Oct. 3, 2024

(30) Foreign Application Priority Data

Mar. 31, 2023 (KR) ........................ 10-2023-0042864

(51) Int. Cl.
*H02K 1/20* (2006.01)
*H02K 9/00* (2006.01)
(52) U.S. Cl.
CPC ........... *H02K 1/20* (2013.01); *H02K 2213/03* (2013.01)

(58) Field of Classification Search
CPC .. H02K 1/20; H02K 9/00; H02K 9/20; H02K 9/12
USPC ......................................... 310/52, 54, 58, 59
See application file for complete search history.

(56) References Cited

U.S. PATENT DOCUMENTS 5,331,238 A * 7/1994 Johnsen ................ H02K 5/203
310/58

* cited by examiner

*Primary Examiner* — Jose A Gonzalez Quinones
(74) *Attorney, Agent, or Firm* — Morgan, Lewis & Bockius LLP

(57) ABSTRACT

Provided is a motor cooling structure including: a motor housing having a hollow cylinder shape; a stator core accommodated in the motor housing, and including a plurality of concentric ring-shaped split cores stacked therein; and a cooling pipe receiving cooling fluid flowing from the outside, and providing cooling fluid to the stator core, wherein the split core includes a plurality of passage parts which are recessed in an outer circumference and through which the cooling fluid flows, and a plurality of press-fit parts protruding from the outer circumference, and the passage parts communicate with each other not to form a straight line when the plurality of split cores are stacked.

16 Claims, 7 Drawing Sheets

[FIG. 1]
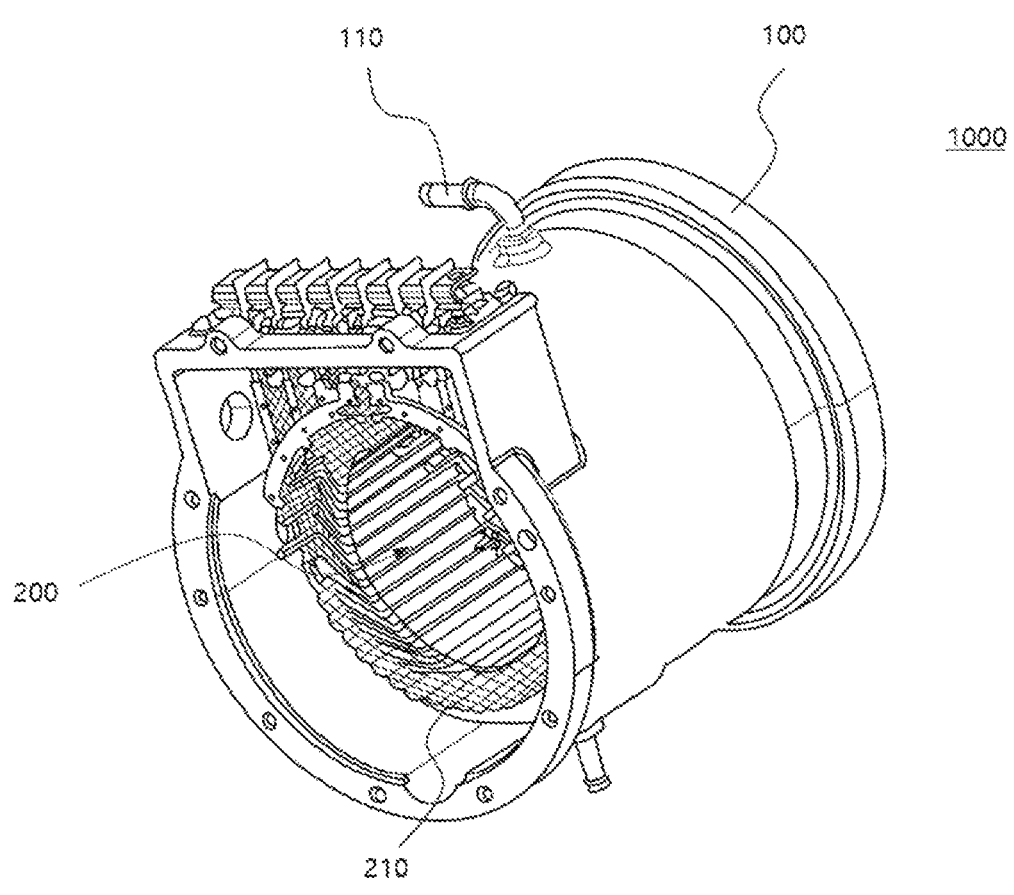

[FIG. 2]
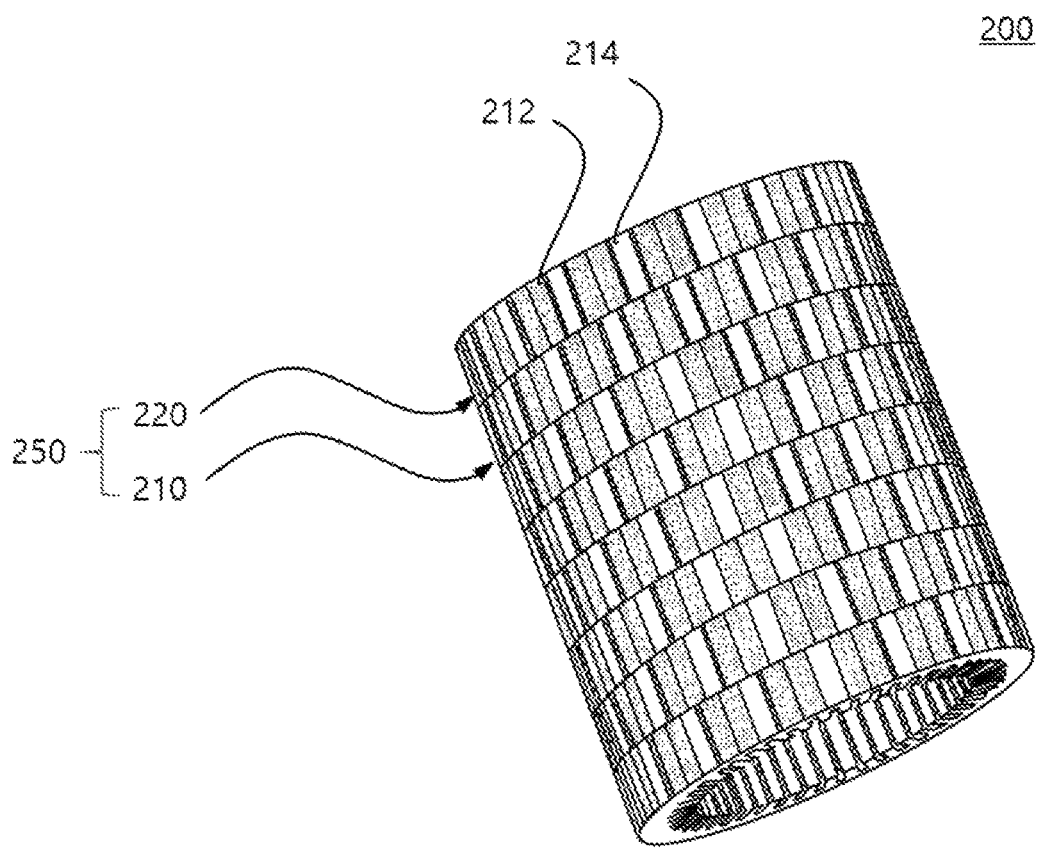

[FIG. 3]
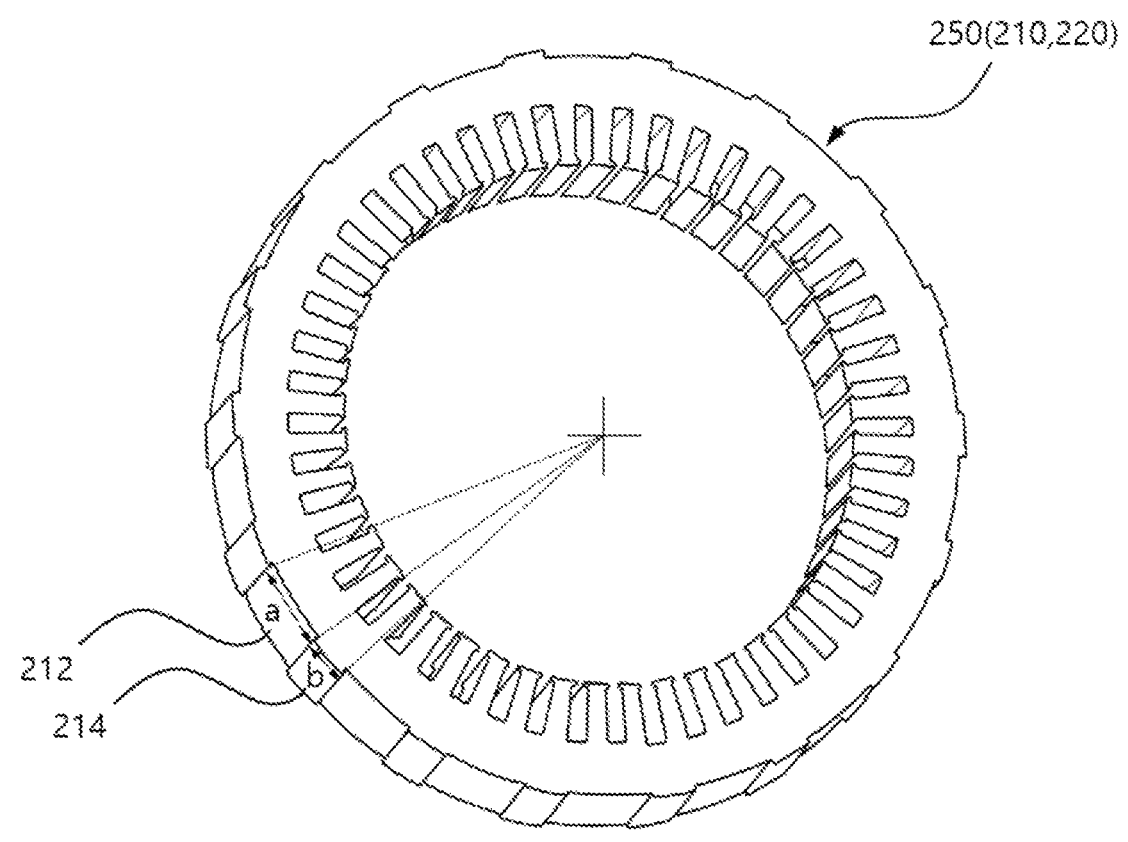

[FIG. 4]
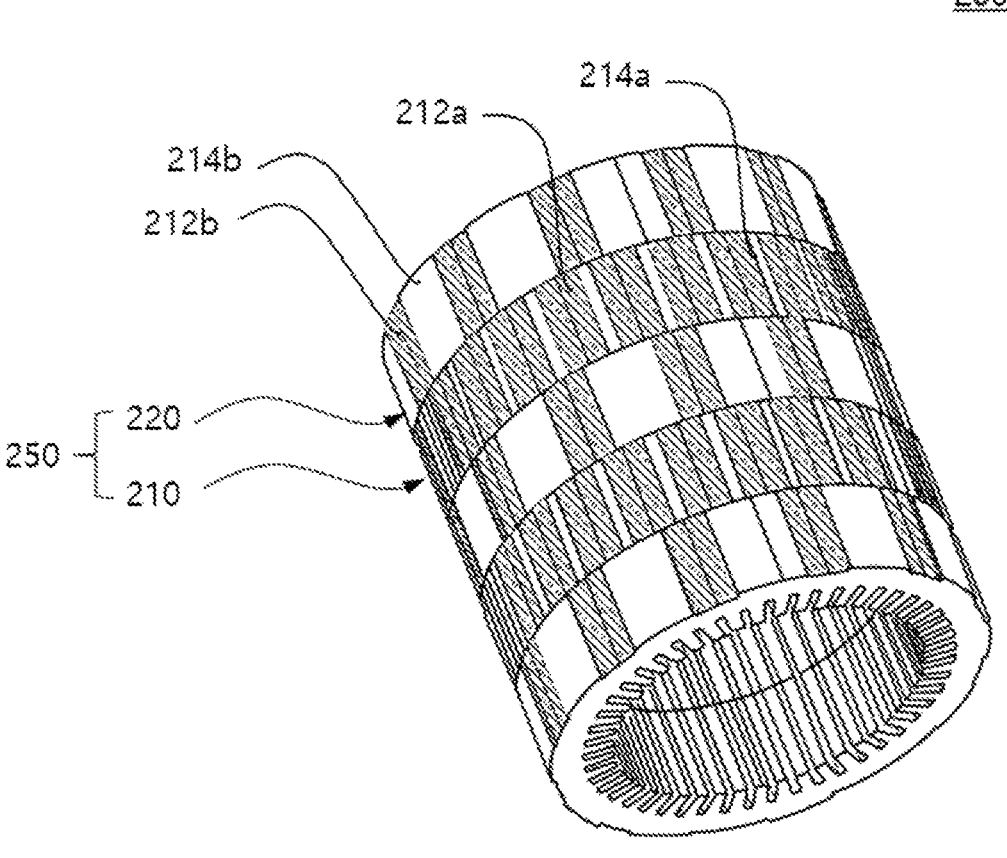

[FIG. 5]
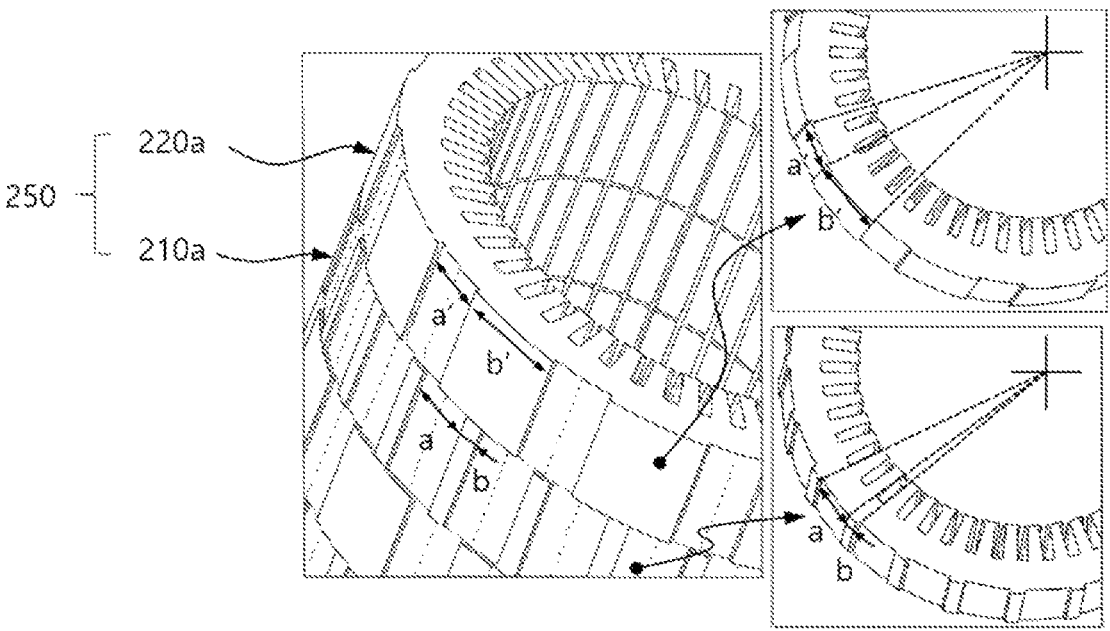

[FIG. 6]
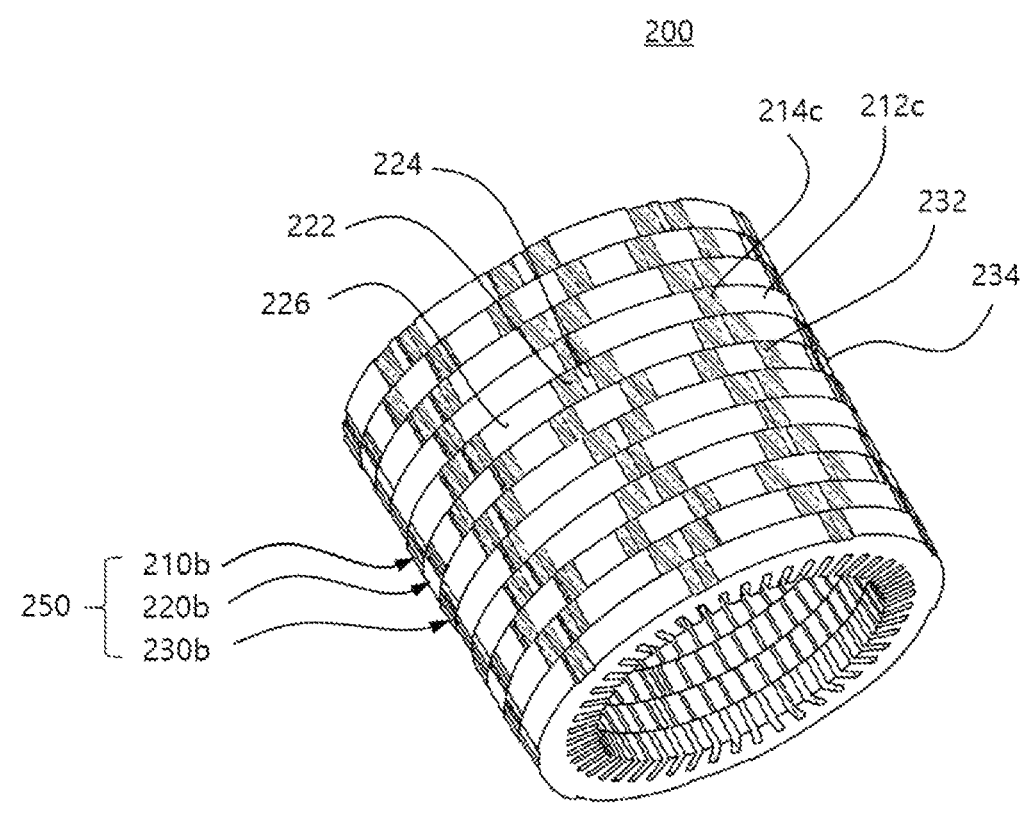

[FIG. 7]
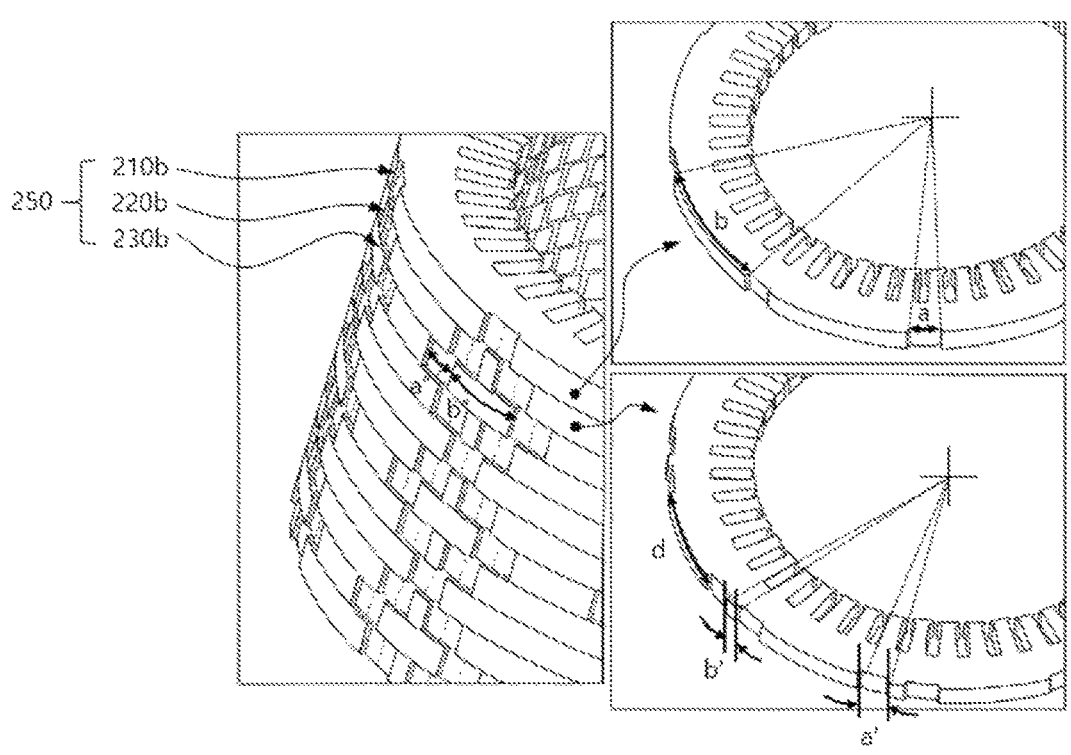

MOTOR COOLING STRUCTURE

CROSS-REFERENCE TO RELATED APPLICATIONS

This application claims priority under 35 U.S.C. § 119 to Korean Patent Application No. 10-2023-0042864, filed on Mar. 31, 2023, in the Korean Intellectual Property Office, the disclosure of which is incorporated herein by reference in its entirety.

TECHNICAL FIELD

The following disclosure relates to a motor cooling structure, and more particularly, to a motor cooling structure in which a passage part of a stator core is not formed in a straight line.

BACKGROUND

A hybrid vehicle may be driven in an electric vehicle (EV) mode which is a pure electric vehicle mode using only power of a drive motor, or driven in a hybrid electric vehicle (HEV) mode using both torque of an engine and the drive motor as power. In this way, the drive motor used as a power source of the vehicle may include a stator core and a rotor core, the stator core may be coupled to the inside of the motor housing, and the rotor core may be disposed inside the stator core.

The stator core may include a core body made of an electrical steel plate, a coil wound around the core body and an end coil disposed at each of the upper and lower parts of the core body, and high temperature heat may occur in the stator core based on a current applied to the coil. In addition, an eddy current may occur in the stator core by a back electromotive voltage caused by the current applied to the coil and a change in magnetic flux generated by a rotating magnet. Therefore, as the high temperature heat occurs in the stator core due to the current, the drive motor mounted on the vehicle may be necessarily required to be cooled to prevent heat damage thereto and ensure its continuous stable operation.

Two types of cooling methods exist for the drive motor: an oil-cooling method using oil and a water-cooling method using a coolant. Among these methods, in the case of the oil-cooling method, a cooling pipe may be installed between the stator core and the motor housing to cool the stator core. In detail, the cooling pipe may include a pair of straight pipes and a pair of circular pipes, and the straight pipe may extend to be parallel to the coupling part and spray oil on the core body to cool the same.

In order to cool the core, a passage through which oil may flow may be formed on an outer circumference of the core, and simultaneously, a press-fit part fitted into the motor housing may be positioned on the outer circumference of the core.

However, the passage may generally have a straight line shape, which may prevent oil from spreading evenly around the outer circumference of the core, resulting in poor cooling performance. When the passage is excessively wide to improve cooling performance of the core, the press-fit part may not be sufficiently large, thus making the coupling of the motor housing and the stator core difficult.

For the above reasons, the field is seeking a way to stably couple the motor housing with the stator core while efficiently cooling the entire circumference of the stator core, and has not yet achieved any satisfactory result.

SUMMARY

An embodiment of the present disclosure is directed to providing a motor cooling structure which may efficiently cool an entire circumference of a stator core.

Another embodiment of the present disclosure is directed to providing a motor cooling structure which may stably couple a motor housing with the stator core.

Aspects of the present disclosure are not limited to the above-mentioned aspects, and other aspects that are not mentioned here may be obviously understood by those skilled in the art from the following description.

In one general aspect, a motor cooling structure includes: a motor housing having a hollow cylinder shape; a stator core accommodated in the motor housing, and including a plurality of concentric ring-shaped split cores stacked therein; and a cooling pipe receiving cooling fluid flowing from the outside, and providing the cooling fluid to the stator core, wherein the split core includes a plurality of passage parts which are recessed in an outer circumference and through which the cooling fluid flows, and a plurality of press-fit parts protruding from the outer circumference, and the passage parts communicate with each other not to form a straight line when the plurality of split cores are stacked.

The split core may include a first split core, and a second split core stacked to be in contact with the first split core at a predetermined rotation angle based on a center of the first split core, the first split core and the second split core have the same shape as each other, and the first split core and the second split core are repeatedly stacked.

$a < \theta < b$ (here, $N(a+b)=2\Pi$)) when the plurality of passage parts are disposed at equal intervals with a central angle a, the plurality of press-fit parts are disposed at equal intervals with a central angle b, based on a center of the split core, and the rotation angle is given as $\theta$.

The split core may include a first split core, and a second split core stacked to be in contact with the first split core, the first split core and the second split core may be repeatedly stacked, and the first split core may have more passage parts than the second split core.

A total area of the passage part provided in the first split core may be larger than a total area of the passage part provided in the second split core.

$b < a'$, $\theta < a$ (here, $N(a+b)=2\Pi$, and $N(a'+b')=2\Pi$) when the plurality of passage parts of the first split core are disposed at equal intervals with a central angle a, the plurality of press-fit parts of the first split core are disposed at equal intervals with a central angle b, the plurality of passage parts of the second split core are disposed at equal intervals with a central angle a', the plurality of press-fit parts of the second split core are disposed at equal intervals with a central angle b', based on a center of the split core, and the rotation angle is given as $\theta$.

$$2(a+b) = a' + b'.$$

$$a = a'.$$

The split core may include a first split core, a second split core stacked to be in contact with the first split core, and a third split core stacked to be in contact with the second split core, and in at least one of the first split core, the second split core, and the third split core, a first press-fit part, in which a central angle of the press-fit part is b', and a second press-fit part, in which a central angle of the press-fit part is d greater than b', may be disposed alternately with each other based on a center of the split core.

b'<a, b"<2a+b', 2a+b'≥b, b<5a+2b' (here, N(a+b)=2Π, and N(a'+b')=2Π N(2a"+b"+d)=2Π) when the plurality of passage parts of the first split core are disposed at equal intervals with the central angle a, the plurality of press-fit parts of the first split core are disposed at equal intervals with the central angle b, the plurality of passage parts of the second split core are disposed at equal intervals with the central angle a', the first press-fit part with the central angle of b' and the second press-fit part with the central angle of d greater than b' are disposed alternately with each other, the plurality of passage parts of the third split core are disposed at equal intervals with a central angle a", and the plurality of press-fit parts are disposed at equal intervals with a central angle b", based on the center of the split core.

$$b'' = (b - a)/2.$$
$$a = a' = a''.$$

The first split core, the second split core, the third split core, the second split core, and the first split core may be sequentially stacked to form a set of the split core, and the sets of the split core may be repeatedly stacked.

The stator core and the motor housing may be fixed with each other by fitting the motor housing with the press-fit part.

BRIEF DESCRIPTION OF THE DRAWINGS

FIG. 1 is a view schematically showing a motor cooling structure according to an embodiment of the present disclosure.

FIGS. 2 and 3 are views each showing a split coil in an example of the present disclosure.

FIGS. 4 and 5 are views each showing the split coil in another example of the present disclosure.

FIGS. 6 and 7 are views each showing the split coil in still another example of the present disclosure.

DETAILED DESCRIPTION OF EMBODIMENTS

Hereinafter, an embodiment is described in detail with reference to the accompanying drawings to be easily practiced by those skilled in the art to which the present disclosure pertains. However, the present disclosure may be implemented in various different forms and is not limited to the embodiment described herein. In addition, in the drawings, portions unrelated to the description are omitted to clearly describe the present disclosure, and similar portions are denoted by similar reference numerals throughout the specification.

Throughout the specification, when one part is referred to as being "connected to" another part, one part and another part may be "directly connected to" each other, or may be "electrically connected to" each other with a third part interposed therebetween.

Throughout the specification, when one member is referred to as being positioned "on" another member, one member and another member may be in contact with each other, or a third member may be interposed between one member and another member.

Throughout the specification, "including" one component is to be understood to imply the inclusion of another component rather than the exclusion of another component, unless explicitly described to the contrary. As used throughout the specification, a term of degree "about", "substantially", or the like is used to indicate the number of a stated meaning or its approximation when its manufacturing or material tolerance inherent therein are given. Such a term is used to prevent unscrupulous infringers from unfairly using the present disclosure in which exact or absolute figures are stated to facilitate the understanding of this application. As used throughout the specification, a term of "step of (doing)" or "step of~" does not indicate a "step for~".

Hereinafter, the embodiment of the present disclosure is described in detail with reference to the accompanying drawings and the description provided below. However, the present disclosure is not limited to the embodiment described herein, and may also be embodied in another form. The same reference numerals denote same components throughout the specification.

Hereinafter, the embodiment of the present disclosure is described in detail with reference to the accompanying drawings and the description provided below. However, the present disclosure is not limited to the embodiment described herein, and may also be embodied in another form. Same reference numerals denote same components throughout the specification.

FIG. 1 is a view schematically showing a motor cooling structure 1000 according to an embodiment of the present disclosure.

Referring to FIG. 1, the motor cooling structure 1000 according to an embodiment of the present disclosure may include a motor housing 100, a stator core 200, and a cooling pipe 110.

The motor housing 100 may have a hollow cylinder shape, and include the stator core 200 therein. For example, an inner diameter of the motor housing 100 may match a rotation axis around which the stator core 200 is rotated. However, unlike the above shape, the motor housing 100 may have various shapes to correspond to the above specifications, capacity, or installation position based on an intended use. Accordingly, the motor housing 100 may not be limited to any specific shape except for a fixing structure of the motor housing 100 and the stator core 200 in this embodiment.

In the stator core 200, a plurality of concentric ring-shaped split cores may be stacked. A coil 201 may be wound around the stator core 200, and a rotor (not shown) system may be formed by magnetic flux generated by the coil 201. The stator core 200 may have a cylinder shape with one end and the other end communicating with each other. A rotor core (not shown) may be positioned inside or outside the stator core 200. When an electromagnetic field is generated by power supply, the stator core 200 and the electrons may interact with each other, and the rotor (not shown) may be rotated and driven together with the stator core 200.

The split core 250 may include a plurality of passage parts 212 which are recessed in an outer circumference of the core and through which cooling fluid flows, and a plurality of press-fit parts 214 protruding from the outer circumference, and the passage parts 212 may communicate with each other not to form a straight line when the plurality of split cores 250 are stacked (see FIGS. 2 to 7). For example, the passage parts 212 may have a zigzag shape, an X-shape, a net shape, or the like when the plurality of split cores 250 are stacked.

The reason is to ensure that the cooling fluid flows in a curved manner when flowing through the passage part 212. The cooling fluid flowing in the curved manner to thus form a turbulent flow may increase cooling efficiency of the core compared to when the cooling fluid flows in the straight line.

The press-fit part 214 may fix the motor housing 100 and the stator core 200 with each other. For example, the motor housing 100 may include a coupling part whose shape correspond to that of the press-fit part 214. As the press-fit part 214 is fitted into the coupling part, the motor housing 100 and the stator may be fixed with each other. The fit may be achieved through heat fit in which the motor housing 100 is heated to expand the inner diameter of the motor housing 100. The stator core 200 may be fitted into the expanded motor housing 100, and as a temperature of the motor housing 100 is reduced to shrink the motor housing, the motor housing 100 and the stator core 200 may then be tightly coupled with each other. Alternatively, the fit may be achieved through cold fit, in which the stator core 200 is shrunk by cooling the stator core 200. The shrunk stator core 200 may be fitted into the motor housing 100, and the motor housing 100 and the stator core 200 may then be tightly coupled with each other as a temperature of the stator core 200 is increased to expand the stator core.

The cooling pipe 110 may receive the cooling fluid supplied from the outside, and provide the cooling fluid to the stator core 200. For example, the cooling fluid may be oil. Alternatively, the cooling fluid may be a coolant or gas. The cooling fluid may be sprayed through the cooling pipe 110. A method in which the cooling fluid supplied through the cooling pipe 110 is not limited thereto, and may be any method in which the cooling fluid may flow along a cooling passage.

Example 1

FIGS. 2 and 3 are views each showing the split core 250 in an example of the present disclosure.

Referring to FIG. 2, the split core 250 may include a first split core 210 and a second split core 220. The first split core 210 and the second split core 220 may be stacked alternately with each other. The first split core 210 and the second split core 220 may be repeatedly stacked. For example, in the split core 250, the second split core 220 may be stacked on the first split core 210 at a predetermined rotation angle with the first split core 210 based on the center of the first split core 210, and the first split core 210 and second split core 220 may have the same shape as each other. That is, the first split core 210 and the second split core 220 may have the same passage part 212 and press-fit part 214. Each of the passage part 212 and the press-fit part 214 may have a predetermined arc length along the outer circumference of each split core 250. For example, the passage parts 212 positioned in each of the first split core 210 and the second split core 220 may be disposed in the same position while having the same arc length. In addition, the press-fit part 214 positioned on each of the first split core 210 and the second split core 220 may be disposed in the same position while having the same arc length. As the first split core 210 and the second split core 220 have the same shape as each other, the split core 250 may be produced using a single mold.

Referring to FIG. 3, in each of the first split core 210 and the second split core 220, the plurality of passage parts 212 may be disposed at equal intervals with a central angle a, and the plurality of press-fit parts 214 may be disposed at equal intervals with a central angle b, based on the center of the split core 250. When the rotation angle is given as $\theta$, the following relationship may be established: $a<\theta<b$ (here, $N(a+b)=2\Pi$)).

The rotation angle may indicate a central angle at which the second split core 220 is rotated based on the center of the split core 250 while the press-fit part 214 and the passage part 212 are positioned to coincide with each other in a vertical direction when stacking the second split core 220 on the first split core 210 having the same shape.

As the above relationship is established, the press-fit part 214 may be narrower than the passage part 212, and the passage part 212 may have a sufficient area. In addition, the rotation angle may be larger than that of the passage part 212 and smaller than that of the press-fit part 214, and the passage parts 212 may thus be continuously provided even though the passage part 212 is moved through each floor. Accordingly, the passage part 212 positioned in any one split core 250 may be combined with the passage part 212 positioned in the split core 250 positioned in a different floor to form a zigzag-shaped passage.

Example 2

FIGS. 4 and 5 are views each showing the split core 250 in another example of the present disclosure.

Referring to FIG. 4, the split core 250 may include a first split core 210a and a second split core 220a. The first split core 210a and the second split core 220a may be stacked alternately with each other. The first split core 210a and the second split core 220a may be repeatedly stacked. For example, the first split core 210a may have more passage parts 212a than the second split core 220a. In addition, a total area of the passage part 212a provided in the first split core 210a may be larger than a total area of the passage part 212b provided in the second split core 220a. That is, the split core 220, in which an area of the passage part 212b is relatively small and an area of the press-fit part 214b is relatively large, and the split core 210, in which an area of the passage part 212a is relatively large and an area of the press-fit part 214a is relatively small, may be stacked alternately with each other. This case may thus have an advantage of having a large area of the press-fit part 214 and an advantage of having a large area of the passage part 212, while complementing their disadvantages.

Referring to FIG. 5, for example, $b<a'$, $\theta<a$ (here, $N(a+b)=2\Pi$, and $N(a'+b')=2\Pi$) when the plurality of passage parts 212a of the first split core 210a are disposed at equal intervals with the central angle a, the plurality of press-fit parts 214a of the first split core 210a are disposed at equal intervals with the central angle b, the plurality of passage parts 212b of the second split core 220a are disposed at equal intervals with a central angle a', the plurality of press-fit parts 214b of the second split core 220a are disposed at equal intervals with a central angle b', based on the center of the split core 250, and the rotation angle is given as $\theta$.

For example, $2(a+b)=a'+b'$. In an example, a and a' may be the same as each other. To summarize, $b'=a+2b$. The rotation angle may indicate a central angle at which the second split core 220a is rotated based on the center of the split core 250 while ends of the passage parts 212a and 212b are positioned in the vertical direction to match each other when stacking the second split core 220a on the first split core 210a. In a case where a and a' are the same as each other, the rotation angle may be determined in the same way as Example 1. As the above relationship is established, the press-fit part 214b of the second split core 220a may be sufficiently large.

When the plurality of split cores 250 are repeatedly stacked in a set, the area of the press-fit part 214 may be secured in the split core 250 by providing a smaller area for the passage part 212 in any one split core 250. It is thus possible to secure a fixing force when press-fitting the stator core 200 and the motor housing 100. Simultaneously, it is thus possible to evenly cool the stator core 200 by providing sufficient number and area of the passage part 212 in any other split core 250. In addition, the rotation angle is smaller than that of the passage part 212*a* in the first split core, and the passage parts 212*a* and 212*b* may thus be continuously provided even though the passage parts are moved through each floor. Accordingly, the passage part 212 positioned in any one split core 250 may be combined with the passage part 212 positioned in the split core 250 positioned in a different floor to form a zigzag-shaped passage.

In addition, Example 2 may have an increased degree of freedom in designing the passage part 212 compared to Example 1.

Example 3

FIGS. 6 and 7 are views each showing the split core 250 in still another example of the present disclosure.

Referring to FIG. 6, the split core 250 may include a first split core 210*b*, a second split core 220*b*, and a third split core 230*b*. The first split core 210*b*, the second split core 220*b*, and the third split core 230*b* may be sequentially stacked. For example, the first split core 210*b*, the second split core 220*b*, the third split core 230*b*, the second split core 220*b*, and the first split core 210*b* may be sequentially stacked to form a set of the split core 250, and the sets of the split core 250 may be repeatedly stacked.

For example, in at least one of the first split core 210*b*, the second split core 220*b*, and the third split core 230*b*, the first press-fit part, in which a central angle of a press-fit part 214*c*, 224, 234, or 236 is b', and the second press-fit part, in which a central angle of the press-fit part 214*c*, 224, 234, or 236 is d greater than b', may be disposed alternately with each other based on the center of the split core 250. As shown in FIG. 7, the specification describes that in the second split core 220*b*, the first press-fit part 224 with the central angle of b' and the second press-fit part 226 with the central angle of d greater than b' are disposed alternately with each other based on the center of the split core 250.

Referring to FIG. 7, b'<a, b''<2a+b', 2a+b'≥b, b<5a+2b' (here, N(a+b)=2Π, and N(a'+b')=2Π N(2a''+b''+d)=2Π) when the plurality of passage parts 212*c* of the first split core 210*b* are disposed at equal intervals with the central angle a, the plurality of press-fit parts 214*c* of the first split core 210*b* are disposed at equal intervals with the central angle b, the plurality of passage parts 222 of the second split core 220*b* are disposed at equal intervals with the central angle a', the first press-fit part 224 with the central angle of b' and the second press-fit part 226 with the central angle of d greater than b' are disposed alternately with each other, the plurality of passage parts 232 of the third split core 230*b* are disposed at equal intervals with a central angle a'', and the plurality of press-fit parts 234 are disposed at equal intervals with a central angle b'', based on the center of the split core 250.

For example, the respective split cores 250 may be stacked in such a way that connection between the passage parts 212*c*, 222, and 232 is uninterrupted when the cooling fluid is moved through each floor along the passage parts 212*c*, 222, and 232. For example, b''=(b−a)/2. For example, a=a'=a''. In the case where a and a' are the same as each other, the rotation angle may be calculated in the same way as Example 1, and the rotation angle may be a+b. For example, the rotation angle between the first split core 210*b* and the second split core 220*b* may be a+b, and the rotation angle between the second split core 220*b* and the third split core 230*b* may also be a+b.

In Example 3, like Example 2, an area of the press-fit part 214*c*, 224, 234, or 236 may be secured in the split core 250 as any one split core 250 provides a small area for the passage part 212*c*, 222, or 232 when the plurality of split cores 250 are repeatedly stacked in a set. It may thus secure a fixing force when press-fitting the stator core 200 and the motor housing 100. Simultaneously, it is thus possible to evenly cool the stator core 200 by providing sufficient number and area of the passage part 212*c*, 222, or 232 in any other split core 250. In addition, the rotation angle may be smaller than that of the passage part 212*c* in the first split core 210*b*, and the passage parts 212*c*, 222, and 232 may thus be continuously provided even though the passage parts are moved through each floor. Accordingly, the passage part 212*c*, 222, or 232 positioned in any one split core 250 may be combined with the passage part 212*c*, 222, or 232 positioned in the split core 250 positioned in a different floor to form a zigzag-shaped passage.

In addition, Example 3 may have an increased degree of freedom in designing the passage part 212*c*, 222, or 232 compared to Examples 1 and 2.

According to the present disclosure, the stator core 200 may have the increased cooling efficiency by providing the passage part in a form other than the straight line.

In addition, the motor cooling structure according to the present disclosure may have the increased cooling efficiency by adjusting each area of the passage part and press-fit part of the stacked split core 250, and simultaneously have the increased coupling force between the stator core 200 and the motor housing 100.

As set forth above, the motor cooling structure according to an embodiment of the present disclosure may efficiently cool the entire circumference of the stator core.

In addition, the motor cooling structure according to an embodiment of the present disclosure may stably couple the motor housing with the stator core.

Effects of the present disclosure are not limited to the abovementioned effects, and effects that are not mentioned will be clearly understood by those skilled in the art to which the present disclosure pertains from the present specification and the accompanying drawings.

Although the embodiment of the present disclosure is described as above, the embodiment disclosed in the present disclosure is provided not to limit the spirit of the present disclosure but to fully describe the present disclosure. Therefore, the spirit of the present disclosure may include not only each disclosed embodiment but also a combination of the disclosed embodiments. Further, the scope of the present disclosure is not limited by the embodiment. In addition, it is apparent to those skilled in the art to which the present disclosure pertains that various variations and modifications could be made without departing from the sprit and scope of the appended claims, and all such appropriate variations and modifications should be considered as falling within the scope of the present disclosure as equivalents.

What is claimed is:

1. A motor cooling structure comprising:
a motor housing having a hollow cylinder shape;
a stator core accommodated in the motor housing, and including a plurality of concentric ring-shaped split cores stacked therein; and a cooling pipe configured to receive cooling fluid flowing from the outside, and provide the cooling fluid to the stator core, wherein the split cores include a plurality of passage parts which are recessed in an outer circumference of the stator core and through which the cooling fluid flows, and a plurality of press-fit parts protruding from the outer circumference, the passage parts communicate with each other not to form a straight line, the split cores include:

a first split core, and a second split core stacked to be in contact with the first split core, the first split core and the second split core are repeatedly stacked, and the first split core has more passage parts than the second split core.

2. The structure of claim 1, wherein a total area of the passage parts provided in the first split core is larger than a total area of the passage parts provided in the second split core.

3. The structure of claim 1, wherein b<a', θ<a, N(a+b) =2Π, and N(a'+b')=2Π (wherein N is a nonzero natural number), when the plurality of passage parts of the first split core are disposed at equal intervals with a central angle a, the plurality of press-fit parts of the first split core are disposed at equal intervals with a central angle b, the plurality of passage parts of the second split core are disposed at equal intervals with a central angle a', the plurality of press-fit parts of the second split core are disposed at equal intervals with a central angle b', based on a center of the split core, and the rotation angle is given as θ.

4. The structure of claim 3, wherein 2(a+b)=a'+b'.

5. The structure of claim 3, wherein a=a'.

6. The structure of claim 2, wherein b<a', θ<a, N(a+b) =2Π, and N(a'+b')=2Π (wherein N is a nonzero natural number), when the plurality of passage parts of the first split core are disposed at equal intervals with a central angle a, the plurality of press-fit parts of the first split core are disposed at equal intervals with a central angle b, the plurality of passage parts of the second split core are disposed at equal intervals with a central angle a', the plurality of press-fit parts of the second split core are disposed at equal intervals with a central angle b', based on a center of the split core, and the rotation angle is given as θ.

7. The structure of claim 6, wherein 2(a+b)=a'+b'.

8. The structure of claim 6, wherein a=a'.

9. A motor cooling structure comprising:

a motor housing having a hollow cylinder shape;

a stator core accommodated in the motor housing, and including a plurality of concentric ring-shaped split cores stacked therein; and a cooling pipe configured to receive cooling fluid flowing from the outside, and provide the cooling fluid to the stator core, wherein the split cores include a plurality of passage parts which are recessed in an outer circumference of the stator core and through which the cooling fluid flows, and a plurality of press-fit parts protruding from the outer circumference, the passage parts communicate with each other not to form a straight line wherein the split cores include:

a first split core, a second split core stacked below the first split core, and a third split core stacked below the second split core, and in at least one of the first split core, the second split core, and the third split core, a first press-fit part, in which a central angle of the press-fit part is b', and a second press-fit part, in which a central angle of the press-fit part is d greater than b', are disposed alternately with each other based on a center of the split core.

10. The structure of claim 9, wherein b'<a, b"<2a+b', 2a+b'≥b, b<5a+2b', N(a+b)=2Π, and N(a'+b')=2Π, N(2a"+ b"+d)=2Π (wherein N is a nonzero natural number), when the plurality of passage parts of the first split core are disposed at equal intervals with the central angle a, the plurality of press-fit parts of the first split core are disposed at equal intervals with the central angle b, the plurality of passage parts of the second split core are disposed at equal intervals with the central angle a', the first press-fit part with the central angle of b' and the second press-fit part with the central angle of d greater than b' are disposed alternately with each other, the plurality of passage parts of the third split core are disposed at equal intervals with a central angle a", and the plurality of press-fit parts are disposed at equal intervals with a central angle b", based on the center of the split core.

11. The structure of claim 10, wherein b"=(b−a)/2.

12. The structure of claim 11, wherein a=a'=a".

13. The structure of claim 10, wherein a=a'=a".

14. The structure of claim 9, wherein the first split core, the second split core, the third split core, the second split core, and the first split core are sequentially stacked to form a set of the split core, and the sets of the split core are repeatedly stacked.

15. The structure of claim 1, wherein the stator core and the motor housing are fixed with each other by fitting the motor housing with the press-fit parts.

16. The structure of claim 9, wherein the stator core and the motor housing are fixed with each other by fitting the motor housing with the press-fit parts.

* * * * *